United States Patent [19]

Jordan et al.

[11] Patent Number: 4,951,713

[45] Date of Patent: Aug. 28, 1990

[54] OVERFLOW CHECK SYSTEM HAVING AUTOMATIC START-UP

[76] Inventors: Foster A. Jordan, P.O. Box 132, Martindale, Tex. 78655; Jack B. Alberts, 9850 Pagewood La. No.604, Houston, Tex. 77042

[21] Appl. No.: 239,628

[22] Filed: Sep. 2, 1988

[51] Int. Cl.[5] ........................ A01G 25/09; B05B 9/00

[52] U.S. Cl. .................................. 137/895; 137/115; 239/126; 239/318; 239/412; 239/416.5; 239/428

[58] Field of Search ....................... 137/895, 115, 111; 417/177, 187; 239/310, 318, 304, 126, 412, 416.5, 428; 251/82, 94

[56] References Cited

U.S. PATENT DOCUMENTS

| | | | |
|---|---|---|---|
| 1,113,644 | 10/1914 | Jones | 137/111 |
| 1,303,762 | 1/1919 | Bradford | 137/111 |
| 1,983,084 | 12/1934 | Janus | 141/1 |
| 2,064,244 | 12/1936 | Davies | 137/111 |
| 2,790,678 | 4/1957 | Arant | 299/84 |
| 2,916,268 | 12/1959 | Pedrick | 232/126 |
| 3,358,928 | 12/1967 | Melendy | 137/107 |
| 3,512,542 | 5/1970 | Hansen | 137/115 |
| 3,565,290 | 2/1971 | Prussin | 222/57 |
| 3,575,317 | 4/1971 | Prussin | 222/66 |
| 4,061,271 | 12/1977 | Kimbrough | 239/1 |
| 4,182,354 | 1/1980 | Bergstedt | 137/10 |
| 4,310,288 | 1/1982 | Erickson | 417/177 |
| 4,311,160 | 1/1982 | Charland | 137/111 |
| 4,545,739 | 10/1985 | Nicodemus | 417/152 |
| 4,580,948 | 4/1986 | Schmidlin | 417/54 |
| 4,623,301 | 11/1986 | Reynolds | 417/54 |
| 4,673,335 | 6/1987 | Nicodemus | 417/54 |
| 4,687,138 | 8/1987 | Ostergaard | 239/126 |

FOREIGN PATENT DOCUMENTS

| | | | |
|---|---|---|---|
| 2446985 | 9/1980 | France | 137/115 |

*Primary Examiner*—A. Michael Chambers
*Attorney, Agent, or Firm*—Arnold, White & Durkee

[57] ABSTRACT

An overflow and automatic start-up system adapted for use with hydrokinetic amplifiers is disclosed. More particularly, the present invention relates to an overflow check system adapted to provide unit suspension and restart solely by manipulation of a discharge valve at a remote user location.

28 Claims, 5 Drawing Sheets

OVERFLOW CHECK SYSTEM HAVING AUTOMATIC START-UP

BACKGROUND

1. Field of the Invention

The present invention generally relates to an overflow and automatic start-up system adapted for use with hydrokinetic amplifiers. More particularly, the present invention relates to an overflow check system adapted to provide unit suspension and restart solely by manipulation of a valve at a remote user location, where such flexibility in control is accomplished without substantial waste of either the fluid or gas component of the amplifier.

2. Description of the Prior Art

A variety of mechanisms have been developed to exploit the ability of a high temperature vapor to combine with a liquid so as to produce a liquid discharge at a pressure higher than the gas input pressure. Such mechanisms are generally referred to in the art as steam educators or hydrokinetic amplifiers.

Steam educators or hydrokinetic amplifiers generally function by condensing a high temperature vapor, usually steam, into a liquid, usually water, which are then combined into a pressure amplified output liquid. The steam condenses into the water flow imparting its high momentum energy, thereby amplifying the pressure of the input liquid. To achieve start-up or restart, however, such apparatus require a brief initial overflow. After such start-up, the overflow line is then subject to sub-atmospheric pressure and therefore often includes a check valve oriented to block inflow.

Liquid pressure amplifiers can be arranged to receive continuously available liquid and vapor inputs and yet deliver output pressure intermittently via a delivery valve that can open or close on demand. A common example of such a system is a high pressure washing gun powered by a liquid amplifier and having a delivery trigger adapted to assume an "on" or "off" position. When such a delivery valve temporarily closes, the amplifier cannot deliver output pressure thru the unit discharge. The input liquid and vapor continue to flow, however, and pour out the overflow line, wasting both liquid and energy. When the delivery valve reopens, the amplifier restarts, stopping the overflow.

Such devices have a number of obvious disadvantages. First, the operation of such devices generally results in a waste of an inordinate amount of energy and resources in the form of both liquid and vapor when the output of the amplifier is temporarily suspended. Additionally, when such systems are utilized in a cleaning or scouring application, significant quantities of surfactant can also be lost through overflow during a suspension in unit operation.

Other disadvantages of such prior art systems include lack of safety during operation. Slight changes in the flow of either the steam or water component may cause full uncondensed steam flow through the unit discharge. Such high temperature steam discharge may effect detrimental discharge characteristics as well as posing dangers to the unit operator.

SUMMARY OF THE INVENTION

The present invention addresses the above-noted and other disadvantages by providing an overflow check system with capacity for automatic start-up and shutdown of both the vapor and fluid components of a liquid amplifier or eductor by manipulation of the discharge at a remote user location. The operation of such system significantly reduces the waste of both the vapor and liquid components by incorporating a series of check valves to regulate the passage of system components at all phases of system operation. Further, the present invention prevents the passage of full uncondensed steam through the discharge, thus substantially reducing the likelihood of scalding.

The present invention is generally comprised of a multi-valve check system which is integrally coupled to a modified liquid pressure (hydrokinetic) amplifier. The system itself comprises a dump valve assembly which regulates the discharge of both fluid and vapor upon start-up or shutdown, and a steam check valve which regulates the flow of steam through the system during all phases of unit operation. Both the dump valve and the steam check valve are pressure integrated so as to allow for coordinated regulation of fluid and vapor flow components at varying operating pressures. The system is also provided with a bypass valve to allow for discharge of steam or water from the amplifier during unit start-up.

The underlying premise of the design of the present invention is initial fluid flow so as to provide for a medium through which the high pressure, high temperature vapor component may condense. Introduction of fluid flow through the system biases the bypass valve in an open position thereupon allowing for unregulated fluid discharge. Once fluid circulation is achieved, vapor is introduced into the system through a steam check valve or gate which is biased in a closed position. Inlet steam pressure on the valve creates a situation of differential pressure sufficient to override said valve, thus allowing movement of vapor through the amplifier itself. The combination of condensing vapor and water creates a situation of sub-atmospheric pressure inside the amplifier. The low pressure state inside the amplifier serves to close the bypass valve, thereby preventing the entry of air into the system. This flow of air is undesired since the amplifier optimally operates at sub-atmospheric conditions. The high velocity fluid flow created by the amplifier is projected through a fluid eductor at the mouth of the discharge, thereby isolating the system from the high pressure condition in the system discharge.

When the system discharge is temporarily suspended, a situation of high pressure is created at the entrance to the discharge tube. This high pressure state removes the override on the steam check valve thereby blocking steam flow into the system. Similarly, system pressure also overrides the dump and bypass valves, thus preventing fluid and vapor from being externally discharged from the system. The system is now operative yet suspended in a "ready" position without creating a waste of either system components.

When the system discharge is again opened, a reduced system pressure is transmitted to the dump and bypass valves, thereby removing the override and enabling the valves to discharge system components out of the system. In such a fashion, initial fluid flow is again achieved. Sequentially, reduced system pressure creates a differential pressure state across the steam check valve, thereby overriding the valve such as to allow steam flow through the system. Unit start-up is thus automatically recommenced as aforedescribed using only actuation of the amplifier discharge between an "on" and an "off" position.

The present invention has a number of advantages over the prior art. One advantage of the present invention is the utilization of only existing steam inlet pressure and jet discharge flow to accomplish start-up and shutdown from a remote user location without the use of any outside energy source. The present system provides control of the fluid amplifier based on operator control at a remote user location by sensing standard jet discharge flow without the need for additional piping or signal generators.

Another advantage of the present invention is that upon interruption of fluid flow at the terminal end discharge, the control system provides full jet shutoff and resets all control elements to a start-up or "ready" position.

Yet another advantage of the invention is the utilization of an integral secondary vent valve which stabilizes the shutdown system and insulates it from minor jet flow variations caused by changes in steam and water supply pressures and connected discharge equipment flow restrictions.

Another advantage of the present invention is that under normal operating conditions, the overflow check system does not impede the function of the relief system to allow discharge of excess steam or water to both prevent distabilization of system function and to furnish user indication of system efficiency and performance.

DETAILED DESCRIPTION OF PREFERRED EMBODIMENT

Figure 1:
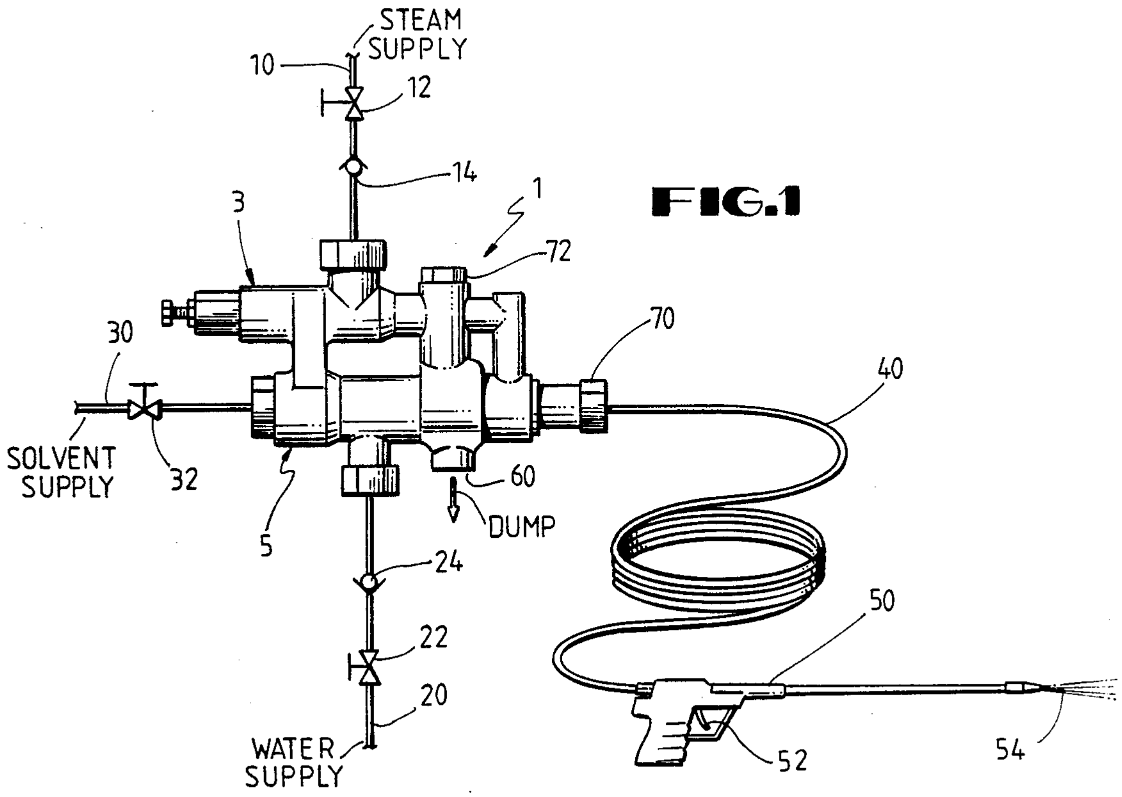
FIG. 1 is a semi-schematic view of the overflow check system relative to component inlets.

FIG. 1 is a side, semi-schematic view of the present invention 1 illustrating the relationship of overflow check system 3 to modified liquid amplifier 5. As may be seen by reference to FIG. 1, the present system is adapted to receive steam through steam inlet 10, said inlet provided with a shutoff valve 12 and a check valve 14. Water is provided through a water inlet 20, water flow being controlled via water shutoff valve 22 and check valve 24. A suitable solvent or surfactant may be introduced in the system through inlet 30, said flow controlled via shutoff valve 32. Surfactant inlet 30 may also be provided with a suitable check valve (not shown).

High pressure, high temperature flow is produced through discharge outlet 70 which may be coupled to a cleaning wand or lance 50 via high pressure hose 40. In such a fashion, high temperature, high pressure fluid flow 54 may be maintained via activation of valve or trigger 52. As illustrated, system overflow is directed through dump outlet 60 as will be further described herein.

It is envisioned that the operation of the present invention may be accomplished by usage of vapor and fluid components readily available in the industrial environment in which the system is used. In this connection, steam directed through inlet 10 may be a by-product of a plant generator or boiler system (not shown). Water directed through water inlet 20 may be provided at unenhanced plant or system water pressure.

Figure 2:
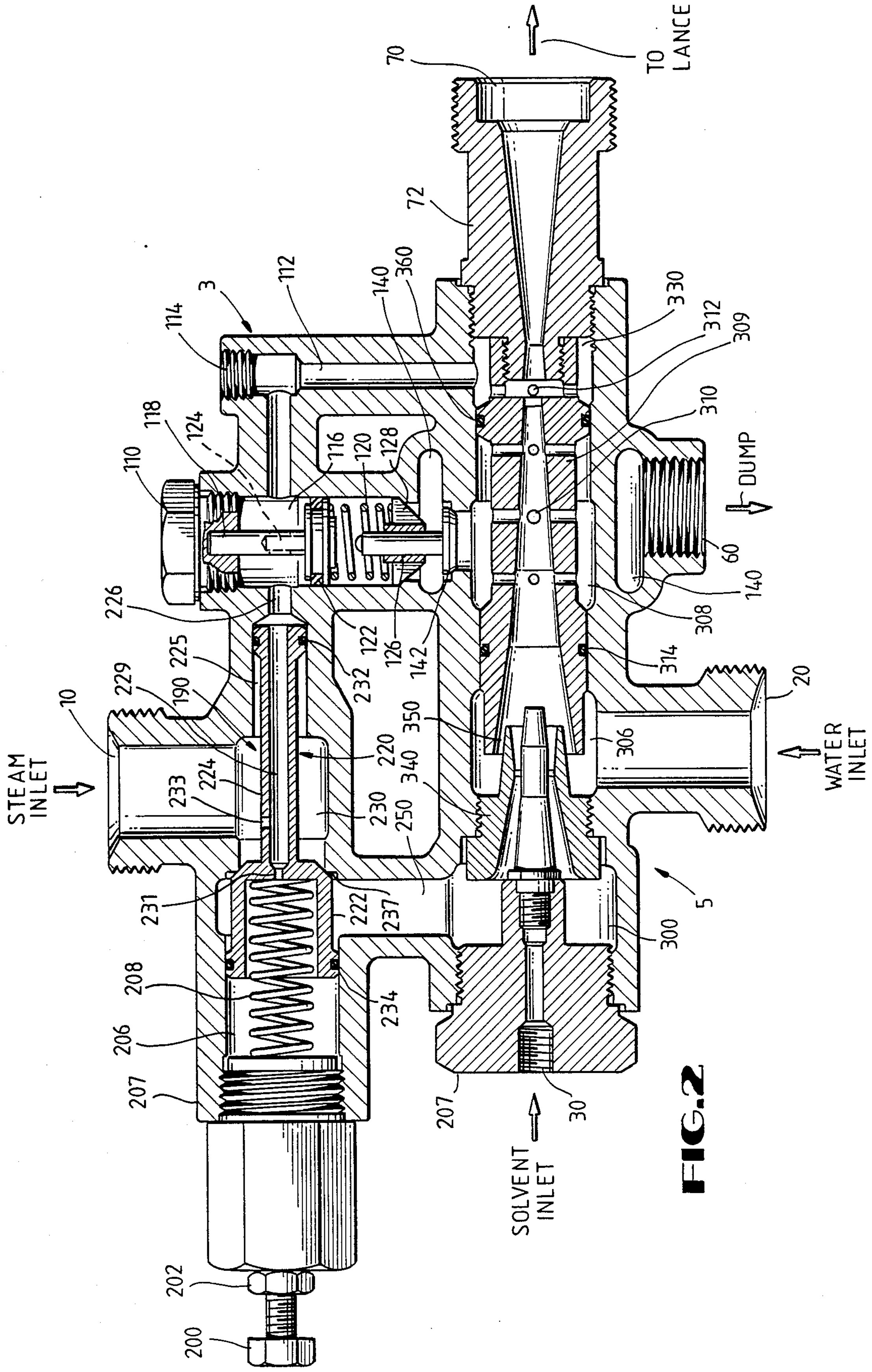
FIG. 2 is a side, cross sectional illustration of the system in an initial start up stage.

FIG. 2 illustrates a cross sectional illustration of the invention as schematically depicted in FIG. 1. As may be seen by reference to FIG. 2, overflow check system 3 is communicatively integrated with a modified liquid amplifier 5 to form a single unit externally defined by a housing 207. Referring to FIGS. 1–2, housing 207 is provided with a steam inlet 10, water inlet 20 and solvent inlet 30. Housing 207 further defines a dump outlet 60 and a discharge outlet 70. As may be seen, vapor is introduced through check system 3 while water and solvent is introduced through amplifier 5.

Steam or vapor passing through steam shutoff valve 12 flows into steam inlet chamber 230. Steam inlet chamber 230 is provided with a steam check valve 190, said valve operable to regulate the flow of steam into steam outlet 250. Valve 190 itself is comprised of a shuttle 220 transversely disposed across steam inlet 10. Steam shuttle 220 includes a larger piston 222 and a smaller piston 224, both pistons coupled in spaced relation as shown. Smaller piston 224 is provided with a longitudinal bore 229 disposed therethrough, said bore communicating with larger piston bore 227 via dampening orifice 231. Larger piston 222 is slidably and sealingly disposed in steam shuttle pressure cavity 206 via sealing element 234, and is biased in a closed position against seat 237 via spring 208. As may be seen by reference to FIGS. 3–4, spring 208 is reciprocably disposed in spring bore 209. Smaller piston 224 is slidably and sealingly disposed in smaller bore 225 via sealing element 232. As illustrated in FIG. 2, smaller piston 224 is provided with an orifice 233 transversely disposed in piston 224 such as to provide fluid communication from steam inlet chamber 230 through orifice 233 into bore 229.

Figure 6:
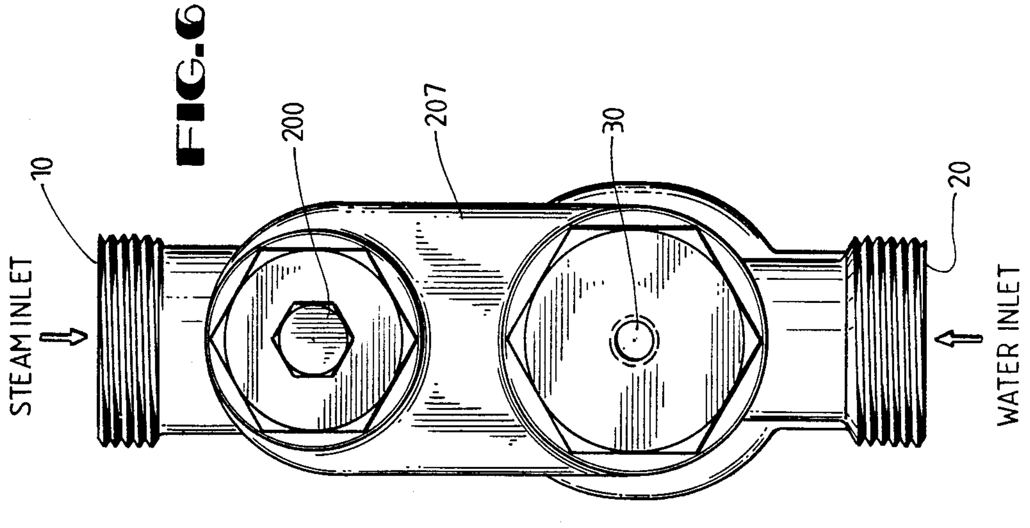
FIG. 6 is an end view of the combination amplifier and overflow check system.

As illustrated in FIG. 2, shuttle 220 establishes a seal across steam outlet 250 when shuttle 220 is in a biased or "closed" position. As shown, the biasing of shuttle 220 is accomplished via spring 208. To establish some flexibility in the degree to which shuttle 220 may reciprocate in chamber 206, spring 208 may be provided with an adjusting screw 200, the advancement of which increases the spring force of spring 208. As illustrated, in FIGS. 2 and 6, screw 200 may be secured via locking nut 202.

Smaller piston 224 reciprocates in bore 225, said bore communicating at its frontal extent with dump valve piston bore 116 via passage 226. As illustrated, piston bore or cavity 116 is transversely disposed in housing 207 relative to passage 226, though other relative orientations of passage 226, bore 225, and bore 116 are envisioned. As may be seen by reference to FIGS. 5 and 7, bore 116 accommodates a dump valve piston 118 which is sealingly disposed in bore 116 via sealing element 122. Piston 118 reciprocates above guide 126 in guide bore 125 which is disposed in dump valve piston housing nut 110. As illustrated in FIG. 2, piston 118 is biased in an up or "open" position via spring 120 which is disposed between piston 118 and guide 126. Piston 118 is provided with a bore 124 longitudinally disposed therethrough, and an orifice 123 transversely disposed relative said bore 124, the combination enabling fluid communication between the piston bore 116 and valve seat 153.

Figure 7:
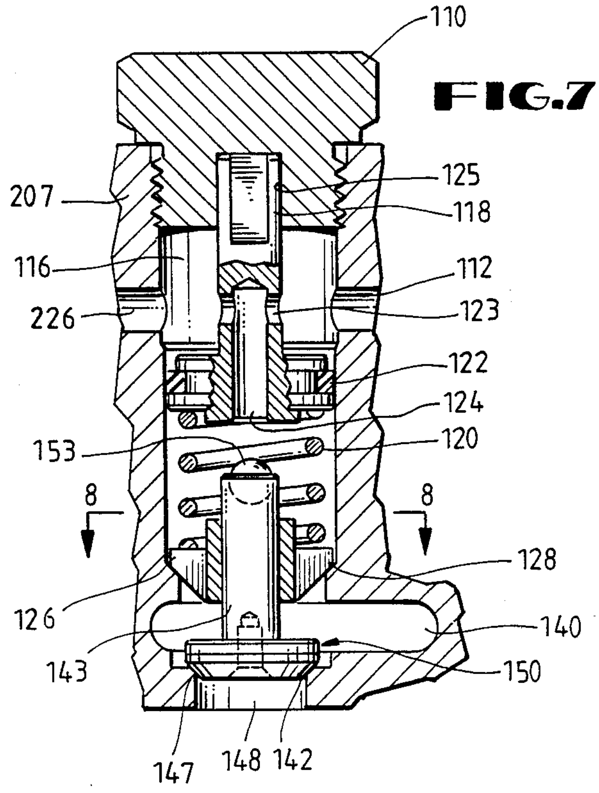
FIG. 7 is a cross section, detail view of the dump and bypass valve assembly.
Figure 8:
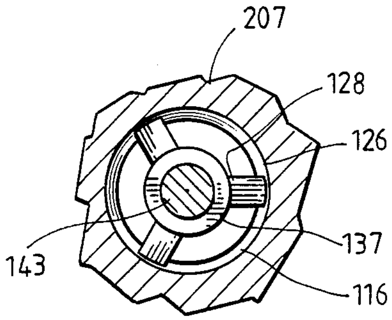
FIG. 8 is a cross sectional view of the dump valve guide.

Referring to FIGS. 7–8, guide valve 126 is fixed in piston bore 116 transverse fluid flow through piston 118. Valve guide 126 is provided with a number of apertures or discharges 128 through which may flow fluid from piston 118. At its inner radial extent, guide 126 is provided with a guide 137 to slidably accommodate bypass valve piston 143 as will be further described.

Figure 4:
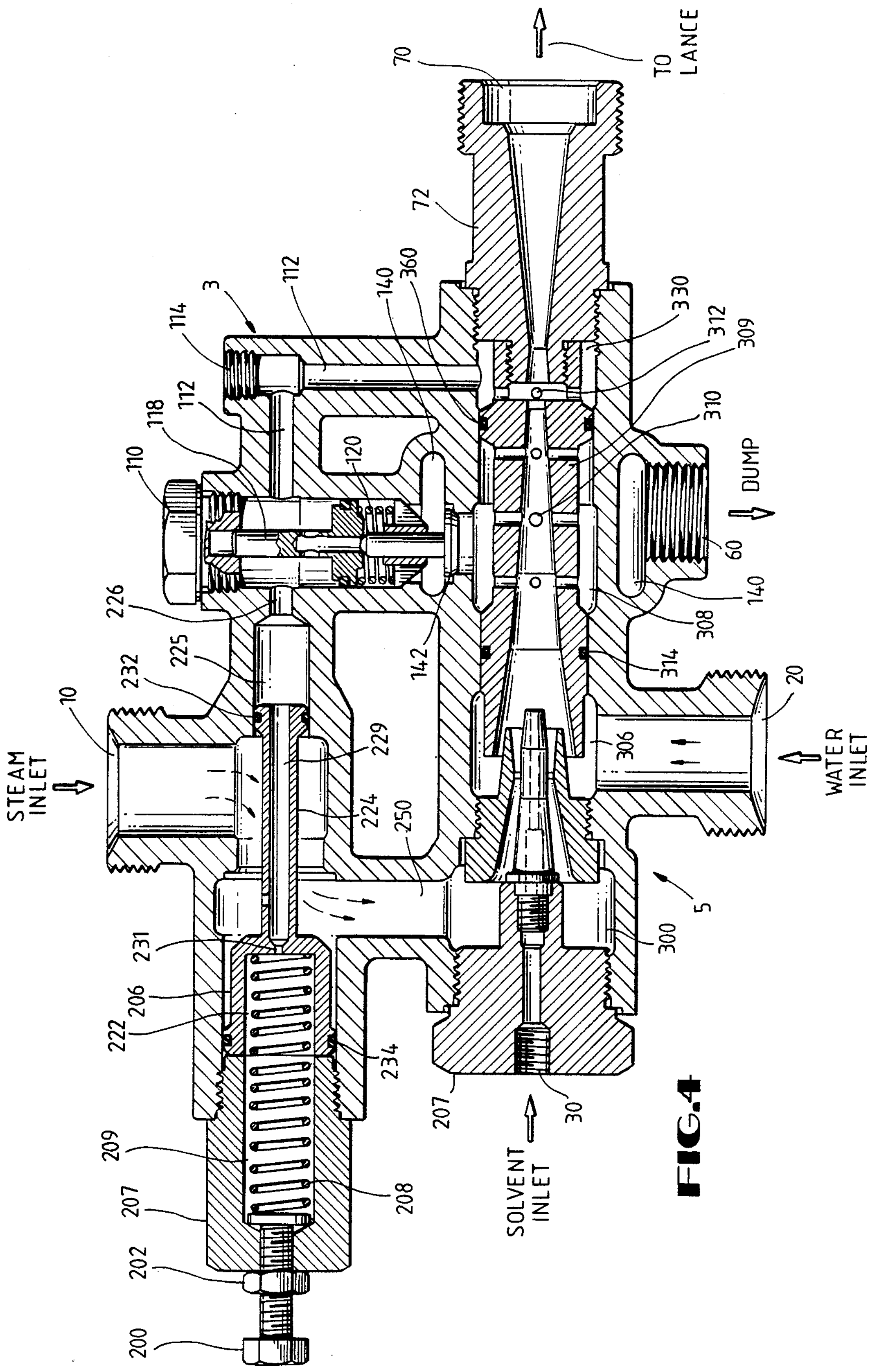
FIG. 4 is a side cross sectional illustration of the system in a suspended operation stage.
Figure 5:
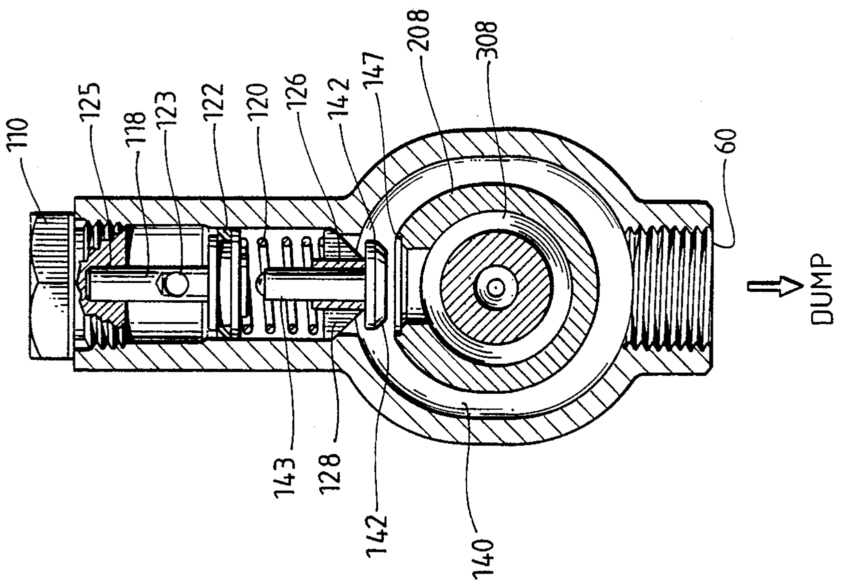
FIG. 5 is an end, cross sectional view of the system illustrating the orientation of the dump and bypass valve assembly.

As illustrated in FIGS. 5, 7–8, bypass valve 150 is slidably disposed above valve seat 147, and comprises bypass valve piston 143 and sealing member 142. Bypass valve 150 reciprocates between valve seat 147 and dump valve guide 126 in bypass chamber 140. Bypass valve piston 143 is slidably coupled to valve guide 126 so as to slidably fit in bore 124 of dump valve piston 118. The terminus of bypass valve piston 143 is preferably provided with a valve seat 153 so as to better establish a fluid tight seal with piston 118 when piston 118 establishes a "closed" position as illustrated in FIG. 4.

Referring to FIGS. 5 and 7, bypass 140 forms an annular jacket around amplifier 5, discharging into system dump outlet 60. It is envisioned that dump outlet 60 may be coupled to an atmospheric discharge drain or a recycling system (not shown). Valve seat 147 is disposed in amplifier housing 207 above combining tube chamber 308 as will be further described herein.

Referring again to FIG. 2, signal tube 112 is coupled to piston bore 116 opposite passage 226, though other relative orientations are envisioned. Signal tube 112 establishes fluid communication between bore 116 and discharge tube inlet 330. A check inlet 114 is provided in signal tube 112 to provide an attachment point for a safety pressure relief valve (not shown). Inlet 114 also facilitates cleaning or maintenance. Similarly, dump valve piston housing nut 110 enables inspection or maintenance of components contained in dump valve piston bore 116.

Overflow system 3 is specifically adapted for use with a modified liquid amplifier 5. However, the general operating principles of amplifier 5, aside from such modifications as will be noted below, are readily apparent to one skilled in the art.

Figure 3:
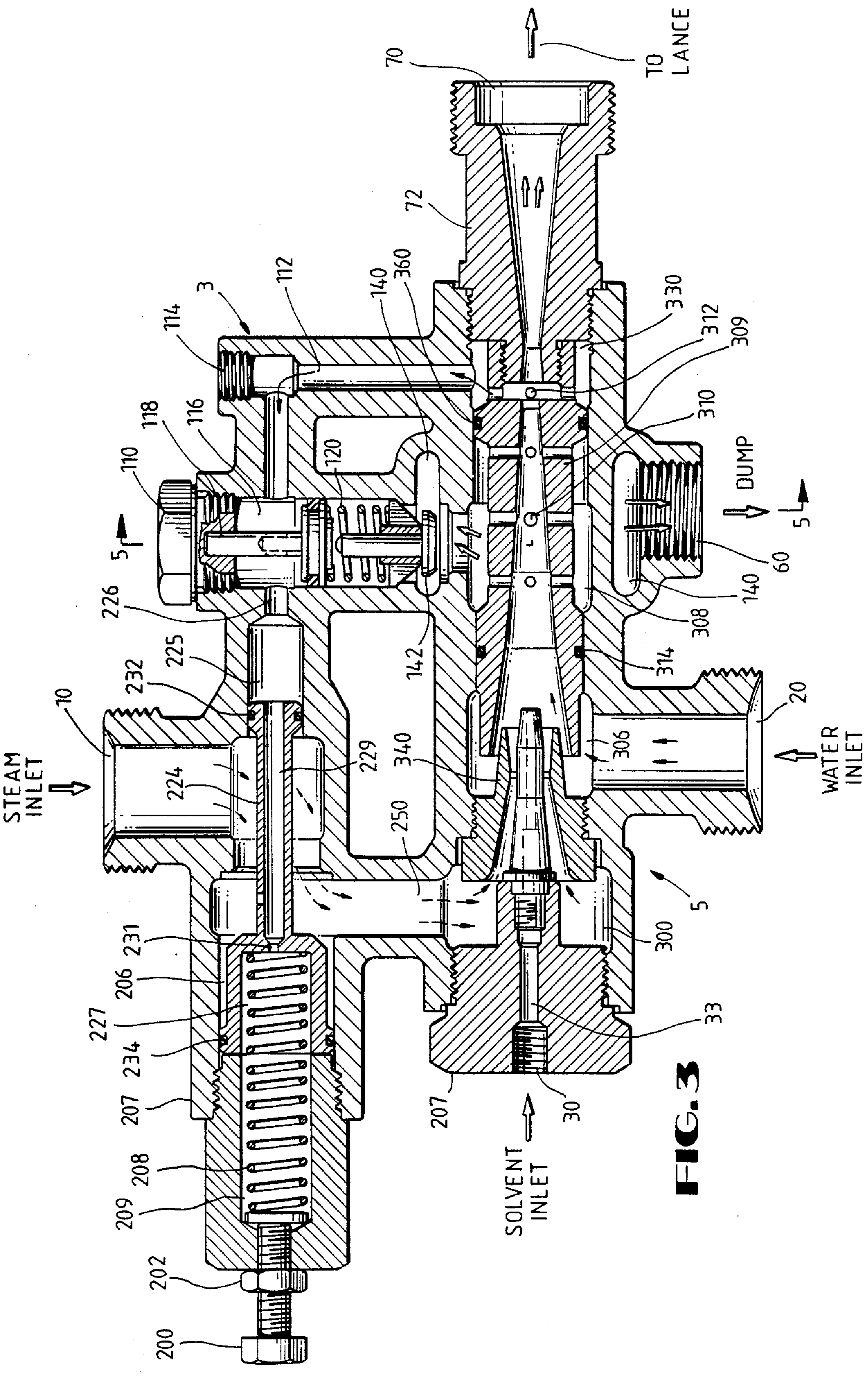
FIG. 3 is a side, cross sectional illustration of the system in an initial operative stage.

The liquid amplifier 5 itself may be seen by reference to FIGS. 2–4. Amplifier 5 is disposed in housing 207, said housing defining a series of segmented chambers through which are disposed inlets for steam, water and solvent. At the distal or upstream end of amplifier 5 is disposed a steam inlet chamber 300, said chamber communicating with steam outlet 250 as aforedescribed. Inlet chamber 300 accommodates steam nozzle 340 which defines a full Venturi with an opening at its downstream end emptying into combining tube nozzle 309. Annulus 350 is situated in water inlet chamber 306 downstream from steam inlet 230 such as to accommodate steam nozzle 340 as shown. Annulus 350 also forms a one-half Venturi opening with a constriction at its downstream end. Annulus 350 empties into combining tube nozzle 309 which is separated from water chamber 306 via sealing element 314. In such a fashion steam injected through steam nozzle 340 is injected through the annulus of water flow through annulus 350. Combining tube chamber 308 is provided with a combining tube nozzle 309, said nozzle also defining a one-half Venturi through its length so as to further compress the high temperature, high velocity water mixture flowing therethrough. Preferably, combining tube nozzle 309 is provided with a series of apertures or vents 310 disposed along its length such as to allow fluid communication between nozzle 309 and tube chamber 308. Combining tube nozzle 309 empties into discharge tube 72, said nozzle and tube defining a full Venturi terminating in discharge outlet 70.

At its upstream extent, discharge tube 72 is disposed in discharge tube inlet 330 which is sealed from combining tube chamber 308 via sealing element 360. As noted, discharge tube inlet or chamber 330 is communicatively coupled to signal tube 112 and is therefore receivable to the passage of fluids therethrough. Discharge tube 72 is also provided with signal ports 312 which enable fluid overflow from tube 72 to enter signal tube 112.

Referring again to check system 3 in reference to FIGS. 2–4, check valve 190 operates responsive to differential system steam pressure at inlet chamber 230 and pressure cavity 206. This is accomplished by steam inlet pressure against shuttle 220 during all phases of system operation. Upon establishment of steam pressure in inlet 230, steam flows through orifice 233 and diverges to flow through bore 229. Steam flowing through bore 229 enters steam pressure cavity or chamber 206 and piston chamber 116, whereupon steam flows through dump valve piston 118 and signal tube 112. Orifice 233, however, is preferably of a smaller diameter than signal tube 112. Hence steam flow through orifice 233 into signal tube 112 results in an overall pressure drop across orifice 233, which pressure drop is transmitted along bore 229 to pressure cavity 206.

Steam pressure in inlet 230 is exerted upon the contact surfaces of large piston 222 and smaller piston 224, particularly through respective sealing elements 234 and 232. Since piston seal 234 has a larger contact surface area than smaller piston seal 232, shuttle 220, in an unbiased condition, would be urged to an "open" position, whereupon large piston 222 would be depressed in pressure cavity 206. Shuttle 220, however is biased in a "closed" position by both spring 208 and the pressure exerted on the closed end of piston 222 by gases in pressure cavity 206. When free gas flow is maintained through signal tube 112, however, a pressure drop is established in chamber 206 diminishing this positive bias such as to urge the reciprocation of shuttle 220, thus opening valve 190. Free gas flow through signal tube 112 is determined by operating conditions through amplifier 5 as will be further discussed herein.

The above described relationship between the size of sealing elements 232 and 234 also serves to minimize the size of check valve housing 3 by reducing the size of the spring 208 necessary to offset the reciprocation of shuttle 220 responsive to system gas pressure. Gas pressure present in inlet 230 operates evenly on both elements 234 and 232. Movement of shuttle to an open position, however, operates due to the relative size of the sealing members. This is offset to some degree by biasing spring 208 and system pressure maintained in cavity 206. A complementary biasing force is also supplied by pressure acting on smaller piston seal 232. Hence, the size of spring 208 may be minimized. The differential size of seat 237 and seal 234 also serves to provide a rapid increase in the differential pressure area upon opening of valve 190.

The relative size of shuttle orifice 233 to vent orifice 134 and orifice 312 is important to maintain consistent pressure therethrough unaffected by the fluctuation or surging in system steam pressures. When orifice 233 is formed of a smaller diameter relative to 134 and 312, more consistency in system pressure in bore 229 and therefore chamber 206 may be maintained, thus allowing a more consistent operation of valve 190.

The operation of the present device may be described in reference to FIGS. 1-4 as follows. To initiate unit start-up, the operator first opens the hand valve on the cleaning lance to its full "open" position. As illustrated in FIG. 1, this may entail moving trigger 52 in lance 50 to a locked "on" position so as to enable flow therethrough. The operator next opens the water shutoff valve 22 thus allowing water flow into the amplifier through water inlet 20. As noted, this water pressure may be that of the local water supply system or an enhanced pressure via an intermediate pressurization system.

Referring to FIG. 2, water entering the system through inlet 20 flows into amplifier whereupon it is directed through water annulus 350. Since cleaning lance 50 is positioned in an "open" position, this water will continue through combining tube nozzle 309 and discharge outlet 70, though some water flow through combining tube nozzle 309 migrates through combining tube vents 310. Water moving through vents 310 flows into combining tube chamber 308, whereupon this flow displaces bypass valve 150 such as to allow fluid flow into bypass 140 and through dump outlet 60. Similarly, some fluid will migrate through signal ports 312 into discharge chamber 330. Provided sufficient water pressure is provided through inlet 20, water in chamber 330 will advance up signal tube 112 whereupon it will flow through dump valve piston 118 and to bypass 140.

When initial water flow has been established through the system, the operator next opens the steam shutoff valve 12, thus allowing steam or hot vapor to enter steam inlet chamber 230. Vapor entering chamber 230 is forced to flow into shuttle bore 229 through orifice 233. Steam flowing into bore 229 passes through small piston 224 and flows into bore 116 through passage 226, whereupon steam flows through signal tube 112 and into the amplifier discharge chamber 330, all the while condensing into system water. Simultaneously, steam from inlet 230 moves through orifices 231 and 233 into the pressure cavity 206 situated behind larger piston 222. Steam flow through signal tube 112 is thus established, creating a pressure drop along tube 112, through bore 229 and pressure cavity 206. The pressure drop in cavity 206 removes some of the biasing affect holding larger piston 222 against seat 237, thus unseating larger piston 222. Shuttle 220 now moves to an open position as illustrated in FIG. 3. Steam may now flow through steam outlet 250 to steam inlet chamber 300 whereupon it is combined with system water in amplifier 5 as aforedescribed.

With both steam and water flowing through the system the operator then balances the system into full operation by slowly reducing the inlet water flow, using water shutoff valve 20, until a preferred flow of one pound of steam per 1 gallon of water is attained. When this optimum operating condition is achieved, steam flow through amplifier 5 will attain its full design velocity through steam nozzle 340, whereupon entering combining tube 309 it will be fully condensed while transferring its velocity energy to water entering tube 309 via water annulus 350. Under this operating condition, the fluid flow vectors in combining tube 309 are such that all water directed through annulus 350 is directed through discharge tube 72 and through high pressure connecting hose 40 to cleaning lance 50. (See FIG. 1) When this condition occurs, a vacuum is established both within combining tube nozzle 309 and combining tube chamber 308. As a result, the flow of water through tube vents 310 and port 312 is reversed. Flow into combining tube chamber 308 allows bypass valve 150 to close, thus preventing a flow of air through sealing member 142, the presence of which will detrimentally affect unit performance by dissipating the near vacuum state formed therein.

The vacuum established at signal port 312 acts to first remove water from signal tube 112 and then deduct and condense steam entering signal tube 112 through shuttle orifice 233. If, due to fluctuation in steam supply pressure or water supply temperatures, the amount of steam entering through orifice 233 exceeds the condensing rate of the amplifier at signal ports 312, dump valve piston orifice 123 (See FIG. 7) provides a steam pressure vent through dump valve discharge 128 to dump outlet 60. Once the system has attained the described balanced condition between steam and water flow as evidenced to the operator by a lack of water discharge through dump outlet 60, the operator may then proceed with cleaning operations and the unit will remain in full operation.

As noted, the present device has particular application in industrial cleaning or scouring applications where high temperature, high pressure flow is desired. As such, the addition of a surfactant or cleaning solvent may be desirable. When a vacuum is established in combining tube chamber 308 and nozzle 309, a cleaning solvent will be pulled through inlet 30 and detergent tube 33 into combining tube nozzle 309 from a reservoir (not shown), and thus be combined with steam/water mix flowing through discharge outlet 70.

When the operator desires to temporarily suspend cleaning operations, the cleaning lance 50 is deactivated (See FIG. 1) via release of trigger 52 or other valve situated at a remote user location. With lance 50 deactivated, the overflow check system now automatically positions the amplifier in a "ready" state, while conserving system water and energy components.

Termination of fluid flow through lance 50 results in a termination of flow through discharge tube 72. This flow stoppage causes a diversion of all water flow through signal ports 312 up into signal tube 112. The combination of this water flow into tube 112 at a pressure many times water supply pressure with the steam flow through shuttle orifice 233 results in a pressure rise in dump valve piston bore 116 above valve piston 118, overcoming the bias supplied by dump valve piston spring 120, and moving valve piston 118 downward until bypass valve piston 143 and hence ball valve 153 seats into dump valve bore 124, thus preventing flow through dump valve discharge 128. Similarly, sealing member 142 of bypass valve 150 is now immovably situated against seat 147, thus preventing flow to bypass 140 from combining tube 308. Hence fluid flow from signal tube 112 and combining tube 308 is suspended. The closing of tube 112 further causes all steam flow through steam shuttle orifice 233 to be diverted thru shuttle dampening orifice 231 into pressure cavity 206, thereby balancing the pressure across shuttle 220 and allowing steam shuttle spring 208 to move piston 222 forward against seat 237 to a closed position, thus isolating steam outlet 250 from steam inlet chamber 230.

As the pressures in the system rise above the supply pressure of the solvent, water and steam supply lines, the respective check valves will close, thus preventing the communication of pressure beyond that of the present system. As long as either the steam or water supply pressures remain above approximately 70 psi, bypass valve 150 and apertures 123 will remain closed, thereby presenting a loss of system components through dump 60.

When a resumption of cleaning operations is desired, the valve 52 and lance 50 is opened, resulting in an immediate pressure release through discharge outlet 70. Referring to FIG. 4, when fluid is released through lance 50, pressure in signal tube 112 is vented through signal ports 312 to discharge tube 72. As this pressure is vented, the pressure acting on dump valve piston 118 is reduced until, at approximately 70 psi pressure, the combining force of dump valve piston spring 120 and the pressure in combining tube 308 lifts bypass valve 150 and dump valve 118. Opening bypass valve 150 allows water from water inlet 20, through combining nozzle 309 and vents 310 to dump outlet 60. The rate of this flow has already been adjusted to the optimum operating level as aforedescribed.

Once bypass valve 150 has opened, its large flow area will allow fluid pressure in sensing tube 112 to continue to decrease. As this pressure declines, fluid pressure in pressure cavity 206 is vented through dampening orifice 231 and shuttle bore 229 to signal tube 112. When the pressure in steam shuttle chamber is reduced to approximately 40 psi, the pressure from steam inlet 10 will begin to overcome the seating force in spring 208, as adjusted by spring adjusting screw 200 for various steam supply pressures. When pressure in cavity 206 is decreased, steam shuttle 220 will again unseat and move to an open position.

As steam flow is established, the system will automatically proceed toward a balanced condition as previously described.

What is claimed is:

1. A system to provide automatic suspension and restart of a vapor powered liquid pressure amplifier from a remote user location, said system comprising:

an overrideable first check valve oriented to block the supply of vapor into the system;

means for applying the vapor pressure of said amplifier to override said check valve so as to allow the flow of vapor therethrough;

means for applying said vapor pressure of said amplifier to remove the override and enable said check valve to block said vapor flow.

2. The system of claim 1 wherein the overrideable check valve is comprised of a shuttle reciprocally disposed transverse the vapor flow and biased in a closed position.

3. The system of claim 2 wherein the shuttle is situated intermediate a compression chamber and a discharge passage, said shuttle including a hollow bore longitudinally disposed therethrough so as to allow communication between said chamber and said passage.

4. The system of claim 3 wherein an aperture is provided in said shuttle so as to allow vapor flow through said shuttle into said chamber and passage.

5. The system of claim 4 wherein said passage communicates with said amplifier.

6. The system of claim 5 wherein an overridable second check valve is disposed along said discharge passage, said valve biased in an open position so as to allow vapor or fluid discharge therethrough.

7. The system of claim 6 further including a means for applying the vapor and fluid pressure of said amplifier to override said second check valve so as to block system discharge of liquid and vapor through said passage.

8. The system of claim 7 further including a means for applying said vapor and fluid pressure of said amplifier to remove the override and enable the disposal of liquid and vapor through said passage.

9. The system of claim 1 further comprising a third overrideable check valve oriented to block the discharge of vapor and liquid from the amplifier.

10. The system of claim 9 further comprising means for applying the fluid pressure of said amplifier to override said third check valve so as to allow the flow of fluid therethrough.

11. The system of claim 10 further comprising a means for applying the fluid pressure of said amplifier to remove the override and enable said third check valve to block the flow of fluid therethrough.

12. An overflow check system for a vapor powered liquid pressure amplifier having a terminal end discharge with liquid and vapor inputs into said amplifier, said system comprising:

an overridable first check valve adapted to block vapor flow into the system;

an overridable second check valve biased to allow vapor or fluid discharge from said system;

a means for applying vapor pressure of said amplifier to override said first check valve so as to allow the flow of vapor therethrough; and a means for applying the vapor and fluid pressure of said amplifier to override said second check valve so as to block the discharge of liquid and vapor therethrough.

13. The check system of claim 12 further comprising:

a means for applying the vapor pressure of said amplifier to remove the override from said first check valve so as to enable said check valve to block said vapor flow.

14. The check system of claim 12 wherein said check valve comprises a shuttle reciprocably disposed in a bore transversely disposed relative to said vapor input.

15. The check system of claim 14 wherein said shuttle includes a bore longitudinally disposed therethrough so as to allow fluid communication between a pressure cavity and a discharge passage where further said piston includes an aperture disposed along its length so as to enable vapor pressure of said vapor inlet to be transmitted therethrough to both the pressure cavity and the discharge passage.

16. The check system of claim 15 wherein the shuttle is spring biased in a closed position, where said spring is adjustable via a screw.

17. The check system of claim 15 wherein said shuttle is comprised of larger and smaller piston communicatively coupled in spaced relation, said larger piston slidably disposed in a larger diameter bore, said smaller piston slidably disposed in a smaller diameter bore.

18. The check system of claim 17 wherein said larger diameter bore includes the vapor outlet.

19. The check system of claim 17 wherein said smaller diameter bore includes the vapor inlet and said discharge passage.

20. The check system of claim 12 further comprising:

a third overrideable check valve adapted to block fluid flow from the amplifier;

a means for applying the fluid pressure of said amplifier to override said third check valve so as to allow the flow of fluid therethrough; and a means for applying the fluid pressure of said amplifier to remove the override of said check valve so as to block the discharge of fluid therethrough.

21. The check system of claim 12 wherein said third check valve is gravity biased in a closed position.

22. An overflow check valve system for a vapor powered liquid pressure amplifier having a user operated terminal end discharge, said system comprising:

a first check valve adapted to block said vapor and liquid overflow from said amplifier;

a second check valve adapted to block vapor flow into said amplifier;

a means for applying the vapor and fluid pressure of said amplifier to override the first check valve so as to allow fluid and vapor flow therethrough; and a means for applying the vapor pressure of said amplifier to remove the override of said first check valve so as to block the overflow from said amplifier, wherein both the means to override said check valve and the means to remove said override are user controlled solely by discharge from said amplifier.

23. The check system of claim 22 further comprising a means to apply system vapor pressure to override the second check valve so as to allow vapor flow therethrough; and a means to apply system vapor pressure to remove the override from said second check valve so as to block vapor flow into said amplifier.

24. The check system of claim 23 wherein said second check valve is spring biased in a closed position.

25. The check system of claim 24 wherein said spring biasing is adjustable.

26. The check system of claim 23 wherein said second check valve comprises a shuttle slidable disposed in a bore transversely disposed relative said vapor flow.

27. The check system of claim 26 wherein said shuttle includes a bore longitudinally disposed therethrough along its length, said bore adapted to allow fluid communication between a pressure cavity and a discharge passage, where further said piston includes an aperture disposed along its length so as to enable system vapor pressure to be transmitted therethrough to both the cavity and the discharge passage.

28. The check system of claim 22 further comprising a third overrideable check valve adapted to block fluid flow from the amplifier; and a means for applying the fluid pressure of said amplifier to override said check valve so as to allow the flow of fluid therethrough.

* * * * *